US010079385B2

(12) United States Patent
Hayashi (10) Patent No.: US 10,079,385 B2
(45) Date of Patent: Sep. 18, 2018

(54) POSITIVE ELECTRODE FOR ALKALINE STORAGE BATTERY AND ALKALINE STORAGE BATTERY USING THE SAME

(71) Applicant: PANASONIC CORPORATION, Osaka (JP)

(72) Inventor: Kiyoshi Hayashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 451 days.

(21) Appl. No.: 14/369,169

(22) PCT Filed: Mar. 4, 2013

(86) PCT No.: PCT/JP2013/001305
§ 371 (c)(1),
(2) Date: Jun. 26, 2014

(87) PCT Pub. No.: WO2013/132818
PCT Pub. Date: Sep. 12, 2013

(65) Prior Publication Data
US 2014/0356702 A1   Dec. 4, 2014

(30) Foreign Application Priority Data
Mar. 5, 2012 (JP) ................. 2012-047639

(51) Int. Cl.
*H01M 4/36* (2006.01)
*H01M 4/62* (2006.01)
(Continued)

(52) U.S. Cl.
CPC ............ *H01M 4/364* (2013.01); *C01G 53/04* (2013.01); *H01M 4/32* (2013.01); *H01M 4/52* (2013.01);
(Continued)

(58) Field of Classification Search
CPC ...... H01M 4/364; H01M 4/624; H01M 4/626; H01M 4/52; H01M 4/32; H01M 10/30; H01M 2004/028; H01M 2300/0014
See application file for complete search history.

(56) References Cited

U.S. PATENT DOCUMENTS 6,017,655 A * 1/2000 Ovshinsky ............ H01M 4/32
429/223
6,027,834 A   2/2000 Hayashi et al.
(Continued)

FOREIGN PATENT DOCUMENTS

CN   1702902 A   11/2005
CN   101114711 A   1/2008
(Continued)

OTHER PUBLICATIONS

English Translation of JP2003-092106.*
(Continued)

*Primary Examiner* — Carlos Barcena
(74) *Attorney, Agent, or Firm* — McDermott Will & Emery LLP (57) ABSTRACT

Provided is a positive electrode for an alkaline storage battery, capable of achieving a high charge efficiency over a wide range of temperature including high temperatures. The positive electrode includes a positive electrode material mixture including: a nickel oxide as a positive electrode active material; a first additive; and a second additive differing from the first additive. An amount of sulfate ions $SO_4^{2-}$ remaining in the nickel oxide is 0.45 mass % or less. The first additive is a compound including at least one selected from the group consisting of ytterbium, indium, calcium, barium, beryllium, antimony, erbium, thulium, and lutetium. The second additive is a compound including at (Continued)

least one selected from the group consisting of titanium, vanadium, scandium, niobium, zirconium, and zinc.

15 Claims, 3 Drawing Sheets

(51) Int. Cl.
    *H01M 4/32*     (2006.01)
    *H01M 10/30*     (2006.01)
    *C01G 53/04*     (2006.01)
    *H01M 4/52*     (2010.01)
    *H01M 4/02*     (2006.01)

(52) U.S. Cl.
    CPC ........... H01M 4/624 (2013.01); H01M 4/626 (2013.01); H01M 10/30 (2013.01); *C01P 2002/52* (2013.01); *C01P 2004/32* (2013.01); *C01P 2004/61* (2013.01); *C01P 2006/80* (2013.01); *H01M 2004/028* (2013.01); *H01M 2300/0014* (2013.01); *Y02E 60/124* (2013.01)

(56) References Cited

U.S. PATENT DOCUMENTS

| | | | |
|---|---|---|---|
| 2001/0049058 A1* | 12/2001 | Hayashi | C01G 53/04 429/223 |
| 2002/0015886 A1 | 2/2002 | Ogasawara et al. | |
| 2002/0098415 A1* | 7/2002 | Sakamoto | H01M 4/32 429/223 |
| 2002/0132166 A1 | 9/2002 | Hayashi et al. | |
| 2003/0104277 A1 | 6/2003 | Tokuda et al. | |
| 2003/0134199 A1* | 7/2003 | Christian | H01M 4/06 429/223 |
| 2004/0209166 A1* | 10/2004 | Kihara | C01B 3/0057 429/218.2 |
| 2005/0053837 A1 | 3/2005 | Nogami et al. | |
| 2006/0257742 A1* | 11/2006 | Kato | C01G 53/00 429/223 |
| 2008/0193842 A1* | 8/2008 | Kato | C01G 53/04 429/223 |
| 2011/0111307 A1* | 5/2011 | Koh | H01M 4/485 429/338 |

FOREIGN PATENT DOCUMENTS

| | | | | |
|---|---|---|---|---|
| EP | 0 834 945 A1 | | 4/1998 | |
| EP | 1 075 031 A1 | | 2/2001 | |
| EP | 1 168 471 A1 | | 1/2002 | |
| EP | 2048728 A1 | | 4/2009 | |
| JP | 10-106552 A | | 4/1998 | |
| JP | 10-106556 A | | 4/1998 | |
| JP | 11-238509 A | | 8/1999 | |
| JP | 2002-358957 A | | 12/2002 | |
| JP | 2003-092106 | * | 3/2003 | ............. H01M 4/32 |
| JP | 2003-092106 A | | 3/2003 | |
| JP | 2003-523043 A | | 7/2003 | |
| JP | 2003-229131 A | | 8/2003 | |
| WO | 99/43035 A1 | | 8/1999 | |

OTHER PUBLICATIONS

International Search Report issued in International Application No. PCT/JP2013/001305 dated Apr. 16, 2013, with English Translation.
Chinese Office Action dated Nov. 2, 2015 issued in the corresponding Chinese Patent Application No. 201380004411.1. (w/ partial English translation).
Japanese Office Action issued in Japanese Application No. 2014-503473, dated Aug. 9, 2016.
Chinese Office Action issued in corresponding Chinese Patent Application No. 201380004411.1, dated Jan. 16, 2017; with partial English translation.

* cited by examiner

POSITIVE ELECTRODE FOR ALKALINE STORAGE BATTERY AND ALKALINE STORAGE BATTERY USING THE SAME

RELATED APPLICATIONS

This application is a national phase of International Application No. PCT/JP2013/001305, filed on Mar. 4, 2013, which in turn claims the benefit of Japanese Application No. 2012-047639, filed on Mar. 5, 2012, the disclosures of which Applications are incorporated by reference herein.

TECHNICAL FIELD

The present invention relates to a positive electrode including a nickel oxide for use in an alkaline storage battery, and an alkaline storage battery using the same.

BACKGROUND ART

Alkaline storage batteries such as nickel-cadmium batteries and nickel-metal hydride batteries are used in various applications due to having high capacity. Particularly, in recent years, alkaline storage batteries are envisioned as being used as, for example, a main power source for hybrid vehicles and electronic devices such as portable devices, and a backup power source for uninterruptible power systems. When used as above, the batteries are required to be charged in a short period of time, and over a wide range of temperatures including high temperatures. Thus, in charging the batteries over a wide range of temperatures, a high charge efficiency is required.

In an alkaline storage battery, a nickel oxide including, for example, nickel oxyhydroxide and nickel hydroxide is mainly used as the positive electrode active material. Moreover, as shown in the formula below, during charge, nickel hydroxide is converted into nickel oxyhydroxide, and during discharge, nickel oxyhydroxide is converted into nickel hydroxide. A positive electrode densely filled with such a nickel oxide has been proposed for use in an alkaline storage battery, in view of increasing capacity and output of the battery.

[Chem. 1]

Negative electrode: $MH + OH^- \rightleftarrows M + H_2O + e^-$
Positive electrode: $NiOOH + H_2O + e^- \rightleftarrows Ni(OH)_2 + OH^-$
Overall: $NiOOH + MH \rightleftarrows Ni(OH)_2 + M$ (Here, M represents a hydrogen storage alloy.)

Moreover, in view of improving charge efficiency and capacity at a high temperature, a study is being made on adding a compound including, for example, Y, In, Sb, Ba, Ca, and Be to the positive electrode of an alkaline storage battery (c.f., Patent Literature 1). In view of improving active material utilization rate at a high temperature and cycle life, a proposal has been made to use 2 or more selected from the group consisting of Y, Yb, and Er as a compound (c.f., Patent Literature 2).

Furthermore, for the purpose of improving charge efficiency at a high temperature, a proposal has been made to make the amount of the sulfate radical (amount of $SO_4^{2-}$) in the $Ni(OH)_2$ crystal, 0.4 weight % or less (c.f., Patent Literature 3).

CITATION LIST

Patent Literatures

Patent Literature 1: Japanese Laid-Open Patent Publication No. Hei 10-106552

Patent Literature 2: Japanese Laid-Open Patent Publication No. Hei 10-106556

Patent Literature 3: Japanese Laid-Open Patent Publication No. Hei 11-238509

SUMMARY OF INVENTION

Technical Problem

When an alkaline storage battery is charged at a high temperature, oxygen tends to be produced at the positive electrode; and due to the oxygen produced, conversion from nickel hydroxide to nickel oxyhydroxide is inhibited. That is, at a high temperature, since a reaction for charge tends to be inhibited, charge efficiency lowers. Moreover, at a high temperature, battery capacity tends to lower due to self-discharge.

However, in association with its increasing use, an alkaline storage battery is required to have a high charge efficiency over a wide range of temperatures including high temperatures. Particularly, regarding its use in hybrid vehicles, since use over a wide range of temperatures is assumed, further improvement in charge efficiency at a high temperature is required.

An object of the present invention is to provide a positive electrode for an alkaline storage battery, capable of achieving high charge efficiency over a wide range of temperatures including high temperatures; and an alkaline storage battery using the same.

Solution to Problem

One aspect of the present invention relates to a positive electrode for an alkaline storage battery including a nickel oxide as a positive electrode active material, a first additive, and a second additive differing from the first additive, an amount of sulfate ions $SO_4^{2-}$ remaining in the nickel oxide being 0.45 mass % or less, the first additive being a compound including at least one selected from the group consisting of ytterbium, indium, calcium, barium, beryllium, antimony, erbium, thulium, and lutetium, and the second additive being a compound including at least one selected from the group consisting of titanium, vanadium, scandium, niobium, zirconium, and zinc.

Another aspect of the present invention relates to an alkaline storage battery including:

the foregoing positive electrode;

a negative electrode including a hydrogen storage alloy capable of electrochemically absorbing and releasing hydrogen;

a separator interposed between the positive and negative electrodes; and an alkaline electrolyte.

Advantageous Effect of Invention

According to the foregoing aspects of the present invention, an alkaline storage battery is capable of achieving high charge efficiency over a wide range of temperatures including high temperatures. Thus, it is possible for an alkaline storage battery to be used over a wide range of temperatures.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

According to one aspect of the present invention, a positive electrode for an alkaline storage battery includes: a nickel oxide as a positive electrode active material; a first additive; and a second additive differing from the first additive. Moreover, the amount of sulfate ions $SO_4^{2-}$ remaining in the nickel oxide is 0.45 mass % or less. Here, the first additive is a compound including a first metal element, that is, at least one selected from the group consisting of ytterbium (Yb), indium (In), calcium (Ca), barium (Ba), beryllium (Be), antimony (Sb), erbium (Er), thulium (Tm), and lutetium (Lu); and the second additive is a compound including a second metal element, that is, at least one selected from the group consisting of titanium (Ti), vanadium (V), scandium (Sc), niobium (Nb), zirconium (Zr), and zinc (Zn).

As mentioned above, when an alkaline storage battery is charged at a high temperature, a reaction for charge is easily inhibited as a consequence of oxygen produced. Thus, since the positive electrode active material is unable to be effectively used for a reaction for charge (i.e., since the utilization rate of the positive electrode active material lowers), charge efficiency tends to lower.

The additives used in Patent Literatures 1 and 2 have an effect of raising oxygen overvoltage at the positive electrode during charge. Thus, use of such additives presumably suppresses production of oxygen at the positive electrode to a certain extent. However, it has been found that, at a high temperature such as 60° C., reduction in the utilization rate of the positive electrode active material (hereafter, also simply referred to as positive electrode utilization rate) may not be suppressible, even with an additive added to the positive electrode material mixture.

Moreover, regarding an alkaline storage battery, since the nickel oxide used as the positive electrode active material derives from a sulfate salt such as nickel sulfate, it is inevitable that sulfate ions $SO_4^{2-}$ remain in the nickel oxide. When the amount of the sulfate ions remaining in the nickel oxide becomes too large, the crystal structure of the nickel oxide becomes unstable, tending to cause defect and disarray in the crystal structure. When such a nickel oxide is used as the positive electrode active material, electrochemical reactions during charge and discharge tend to be non-uniform, and therefore, the positive electrode utilization rate tends to lower.

The present inventor has found that when the amount of the sulfate ions remaining in the nickel oxide becomes large, there may sometimes hardly be any suppression of reduction in the positive electrode utilization rate, even with an additive as used in Patent Literature 1 and 2 added to the positive electrode material mixture. Particularly, in an environment of a high temperature such as 60° C., even when an additive is added to the positive electrode material mixture using the nickel oxide in which the remaining amount of the sulfate ions is large, an effect due to the addition may hardly be obtained in some cases. On the contrary however, it has been found that when the remaining amount of the sulfate ions is small, addition of a combination of the foregoing first and second additives to the positive electrode material mixture significantly suppresses reduction in the positive electrode utilization rate, even in an environment of a high temperature such as 60° C. That is, it has become evident that the combination of the first and second additives exhibits different behaviors depending on the amount of the sulfate ions remaining in the nickel oxide.

The first and second additives in the positive electrode dissolve in the electrolyte, though in small amounts. Due to both of the first and second additives being added to the positive electrode material mixture included in the positive electrode, the first and second additives dissolve in the electrolyte in a compositive manner. It is not clear why the combination of the additives exhibits different behaviors depending on the remaining amount of the sulfate ions. However, in the present invention, reduction in the positive electrode utilization rate is greatly suppressed and high charge efficiency can be achieved even at a high temperature, presumably because the additives that dissolved in the electrolyte in a compositive manner as above, act on the sulfate ions in the nickel oxide and crystal state of the nickel oxide. Such an effect is very specific, and when the remaining amount of the sulfate ions becomes large, the effect cannot be obtained even if both of the first and second additives are used. Even when the remaining amount of the sulfate ions is small, the effect cannot be obtained if only one of the first and second additives is used.

Typically, in hybrid vehicle applications, smooth engine ignition is required when the vehicle is used after a long period of non-use. Thus, problems related to self-discharge tend to be prominent in such applications, and self-discharge is required to be further suppressed.

An alkaline storage battery such as a nickel-metal hydride battery may exhibit a high self-discharge. Self-discharge tends to be prominent at a high temperature in particular. According to one aspect of the present invention, it has also been found that the battery is capable of greatly suppressing self-discharge and maintaining high battery capacity, even when stored for a long period of time. When the remaining amount of the sulfate ions becomes large, such suppression of self-discharge cannot be obtained even if both of the first and second additives are used. Even when the remaining amount of the sulfate ions is small, such suppression of self-discharge cannot be obtained if only one of the first and second additives is used. In the prior art, it has not been known that the remaining amount of the sulfate ions in the nickel oxide and the first and second additives have an influence on suppressing self-discharge.

In the following, embodiments of the present invention will be described in more detail, with arbitrary reference to drawings.

(Positive Electrode)

More specifically, the positive electrode for an alkaline storage battery according to an embodiment of the present invention includes: a conductive support (or core member); and a positive electrode material mixture adhering to the support.

(Support)

The support can be a known conductive support used in a positive electrode for an alkaline storage battery. The conductive support may be a three-dimensional porous body or a flat plate or sheet.

Examples of the material for the support include nickel and nickel alloys.

(Positive Electrode Material Mixture)

The positive electrode material mixture includes the nickel oxide as the positive electrode active material, the first additive, and the second additive.

(Positive Electrode Active Material)

The nickel oxide as the positive electrode active material mainly includes nickel oxyhydroxide and/or nickel hydroxide.

The nickel oxide can be obtained by mixing an aqueous nickel sulfate solution and an aqueous solution of a metal hydroxide. Due to mixing these aqueous solutions, particles including the nickel oxide are deposited in the mixed solution. At that time, to stabilize metal ions such as nickel ions, a complexing agent may be added to the mixed solution or the aqueous nickel sulfate solution. The complexing agent may be added in the form of an aqueous solution.

The deposited nickel oxide may be further washed with an aqueous solution of a metal hydroxide. Due to such washing, the remaining amount of the sulfate ions in the nickel oxide can be reduced, and other impurities in the nickel oxide can be removed.

In the present invention, the amount of the sulfate ions remaining in the nickel oxide serving as the positive electrode active material, is 0.45 mass % or less. The remaining amount of the sulfate ions in the nickel oxide is desirably 0.42 mass % or less, and preferably 0.4 mass % or less. When the remaining amount of the sulfate ions becomes small, crystallinity of the nickel oxide becomes enhanced. The crystallinity of the nickel oxide can be observed based on crystallinity of the (001) plane. Due to enhancement of the crystallinity of the nickel oxide, improvement in charge acceptance is made possible. In view of the above, the remaining amount of the sulfate ions in the nickel oxide being 0.25 mass % or less or 0.2 mass % or less, enables the crystallinity of the nickel oxide to increase easily, and is advantageous in increasing the positive electrode utilization rate. The remaining amount of the sulfate ions is preferably made as small as possible. However, since it is difficult to make the remaining amount of the sulfate ions 0 mass %, the remaining amount thereof may be, for example, 0.01 mass % or more.

Presumably due to the remaining amount of the sulfate ions being 0.45 mass % or less, the crystallinity of the nickel oxide (particularly, the nickel hydroxide in the nickel oxide) becomes enhanced, and an electron-involving reaction progresses smoothly. This presumably causes preferential consumption of electrons in a reaction for converting nickel (II) hydroxide to nickel (III) oxyhydroxide, as well as suppression of a side reaction. Moreover, presumably due to the sulfate ions and crystal structure of the nickel oxide interacting with the first and second additives, a high positive electrode utilization rate can be achieved and thus a high charge efficiency can be secured, even at a high temperature.

When the amount of the sulfate ions remaining in the nickel oxide exceeds 0.45 mass %, even if the first additive and/or the second additive are added to the positive electrode material mixture, an effect due to the addition is hardly obtained, and reduction in the positive electrode utilization rate becomes prominent, particularly at a high temperature. Self-discharge during battery storage also increases.

The remaining amount of the sulfate ions in the nickel oxide can be controlled at the time of mixing the aqueous nickel sulfate solution and the aqueous solution of the metal hydroxide, by adjusting, for example: the concentration of each of the above aqueous solutions; the concentration of the aqueous solution including the complexing agent; the mix ratio among the nickel sulfate, the metal hydroxide, and the complexing agent; the temperature of the mixed solution; and the concentration and temperature of the aqueous solution of the metal hydroxide for washing.

The concentration of the nickel sulfate in the aqueous nickel sulfate solution can be selected from, for example, 1 to 5 mol/dm$^3$, and is preferably 1.5 to 4 mol/dm$^3$ or 2 to 3 mol/dm$^3$.

Examples of the metal hydroxide used as a starting material include alkali metal hydroxides such as sodium hydroxide and potassium hydroxide.

The concentration of the metal hydroxide in the aqueous metal hydroxide solution used as a starting material, can be selected from, for example, 2 to 12 mol/dm$^3$, and is preferably 3 to 10 mol/dm$^3$ or 4 to 8 mol/dm$^3$.

In preparing the nickel oxide, the proportion of the metal hydroxide is such that a stoichiometric ratio of the nickel sulfate to hydroxide ions capable of producing a metal hydroxide, is 1:2 (molar ratio). The hydroxide ions are preferably in a small excess amount of twice the number of moles of nickel in the nickel sulfate, and may therefore be, for example, 2.1 mols or more per 1 mol of the nickel. The upper limit of the hydroxide ions is not particularly limited, and may be 3 mols or less, or 2.5 mols or less, per 1 mol of the nickel.

The complexing agent can be a base, and in particular, is preferably an inorganic base such as ammonia.

The proportion of the complexing agent can be, for example, 1.8 to 3 mols, and is preferably 2 to 3 mols, per 1 mol of the nickel in the nickel sulfate.

When the nickel oxide is produced by continuously feeding the aqueous solutions of the starting materials and the complexing agent into a reactor, the fed amount (e.g., flow rate) of each of the aqueous solutions and the complexing agent (or an aqueous solution of the complexing agent) is adjusted to obtain the above molar ratios.

The temperature of the mixed solution can be selected from, for example, 30 to 65° C., and is preferably 40 to 60° C. or 45 to 55° C.

Examples of the metal hydroxide for washing include alkali metal hydroxides such as sodium hydroxide and potassium hydroxide. The metal hydroxide for washing may be the same kind as the metal hydroxide used as the starting material.

The concentration of the metal hydroxide in the aqueous metal hydroxide solution for washing can be selected from, for example, 2 to 15 mol/dm$^3$, and is preferably 3 to 12 mol/dm$^3$ or 4 to 10 mol/dm$^3$.

The temperature of the aqueous metal hydroxide solution for washing can be selected from, for example, 30 to 65° C., and is preferably 40 to 60° C. or 45 to 55° C.

The average particle size of particles including the nickel oxide obtained is, for example, 3 to 25 μm.

The nickel oxide may include a metal element (third metal element) that is incorporated in the crystal structure of the nickel oxide. That is, the nickel oxide may be a solid solution including the third metal element.

Examples of the third metal element include: alkaline earth metal elements such as magnesium and calcium; and transition metal elements (e.g., group 9 elements such as cobalt, and group 12 elements such as zinc and cadmium, of the periodic table). These third metal elements can be used singly or in a combination of two or more. Preferred among these third metal elements, is at least one selected from the group consisting of magnesium, cobalt, cadmium, and zinc. Particularly, the third metal element preferably includes cobalt and at least one selected from the group consisting of magnesium, cadmium, and zinc; and further preferably includes cobalt and zinc.

When the nickel oxide includes the third metal element as the foregoing, the charge efficiency can be further increased, and the positive electrode utilization rate can be improved more effectively. Particularly, even when the battery is charged at a high temperature, a high charge efficiency is achieved. The effect of suppressing self-discharge during storage also increases.

The amount of the third metal element in the total amount of the nickel and the third metal element included in the nickel oxide is, for example, 0.1 to 10 mass %, preferably 0.5 to 6 mass %, and further preferably 0.7 to 4 mass %. When the amount of the third metal element is within the above range, it is easier to obtain the effect that is due to combining the nickel oxide in which the remaining amount of the sulfate ions is reduced, with the third metal element. When the nickel oxide includes two or more of the third metal elements, the amount of each of the third metal elements can be adjusted so that the total of these third metal elements becomes the amount given above.

The third metal element can be incorporated into the crystal structure of the nickel oxide, by mixing the aqueous nickel sulfate solution and the aqueous metal hydroxide solution in the presence of the third metal element. Specifically, the aqueous nickel sulfate solution, to which an inorganic acid salt of the third metal element (e.g., an inorganic strong acid salt such as a sulfate) is added, is mixed with the aqueous metal hydroxide solution, thereby to enable obtaining a nickel oxide including the third metal element in its crystal structure.

The positive electrode material mixture mainly includes the nickel oxide. The amount of the nickel oxide in the positive electrode material mixture is, for example, 60 mass % or more, and preferably 70 mass % or more. The amount of the nickel oxide therein may be 75 mass % or more or 80 mass % or more.

(First Additive)

The first additive is a compound including the first metal element, that is, at least one selected from the group consisting of Yb, In, Ca, Ba, Be, Sb, Er, Tm, and Lu. The positive electrode material mixture includes the first metal element in the form of a compound, in contrast to the foregoing third metal element. The first additive has a function of raising oxygen overvoltage at a high temperature.

The first additive may be a compound including one of the first metal elements, a compound including two or more of the first metal elements, or a combination of two or more of these compounds.

Examples of the compound serving as the first additive include oxides, hydroxides, fluorides (e.g., $CaF_2$), and inorganic acid salts (e.g., sulfates). These compounds can be used singly or in a combination of two or more. Oxides and hydroxides may be peroxides. Among the above, oxides and hydroxides are preferred.

Among the first additives, for example, $Yb_2O_2$, $In_2O_2$, $BeO$, $Sb_2O_2$, $Er_2O_2$, $Tm_2O_2$, and $Lu_2O_2$ can be given as oxides; and, for example, $Ca(OH)_2$ and $Ba(OH)_2$ can be given as hydroxides.

The first additive is preferably at least one selected from the group consisting of $Yb_2O_2$, $In_2O_2$, $Ca(OH)_2$, $Ba(OH)_2$, $BeO$, $Sb_2O_2$, $Er_2O_2$, $Tm_2O_2$, and $Lu_2O_2$. When such a compound is used, it is easier to obtain the effect that is due to the compound combined with the nickel oxide in which the second additive and the remaining amount of the sulfate ions are controlled.

(Second Additive)

The second additive is a compound including the second metal element, that is, at least one selected from the group consisting of Ti, V, Sc, Nb, Zr, and Zn. The positive electrode material mixture includes the second metal element in the form of a compound, in contrast to the foregoing third metal element. The second additive acts as an auxiliary which enables a further effective exertion of the function of the first additive.

The second additive may be a compound including one of the second metal elements, a compound including two or more of the second metal elements, or a combination of two or more of these compounds.

Examples of the compound serving as the second additive include oxides, hydroxides, fluorides, and inorganic acid salts (e.g., sulfates). These compounds can be used singly or in a combination of two or more. Oxides and hydroxides may be peroxides. Among these, oxides and hydroxides are preferred, and oxides are particularly preferred.

The second additive is preferably at least one selected from the group consisting of $TiO_2$, $V_2O_5$, $Sc_2O_3$, $Nb_2O_5$, $ZrO_2$, and $ZnO$. When such a compound is used, it is easier to obtain the effect that is due to the compound combined with the nickel oxide in which the first additive and the remaining amount of the sulfate ions are controlled.

The amount of the first and second additives in total per 100 parts by mass of the nickel oxide is, for example, 0.1 part by mass or more, preferably 0.5 part by mass or more, and further preferably 0.7 part by mass or more. Moreover, the amount of the first and second additives in total per 100 parts by mass of the nickel oxide is, for example, 10 parts by mass or less, preferably 5 parts by mass or less, and further preferably 3 parts by mass or less. The lower and upper limits of the above can be arbitrarily combined. The total amount of the first and second additives per 100 parts by mass of the nickel oxide may be, for example, 0.1 to 5 parts by mass, or 0.5 to 3 parts by mass.

When the amount of the first and second additives is in the above ranges, it is easier to obtain the effect that is due to their combination with the nickel oxide, and thus advantageous in increasing charge efficiency. Moreover, it is further effective in suppressing self-discharge.

The mass ratio of the first additive to the second additive can be selected from, for example, 1:0.2-5, and is preferably 1:0.3-3 or 1:0.5-2. When the mass ratio is in this range, it is easier to obtain the effect that is due to combining both of the additives. Thus, it is easier to achieve high charge efficiency even at a high temperature, and self-discharge can be effectively suppressed.

(Conductive Agent)

The positive electrode material mixture may further include a conductive agent. The conductive agent may be added to the positive electrode material mixture in the manner of being mixed together with the other components of the positive electrode material mixture (positive electrode active material, first and second additives, and others). Alternatively, a surface of the particles of the nickel oxide serving as the positive electrode active material may be coated with the conductive agent, and the coated particles may be used for the positive electrode material mixture.

Examples of the conductive agent include simple metal substances, alloys, conductive metal oxides, and conductive metal hydroxides. Metal included in these conductive agents are not particularly limited in kind. However, the conductive agent used preferably includes at least cobalt. Examples of such a conductive agent include cobalt metal, cobalt oxides (e.g., $CoO$, $Co_2O_3$, $Co_3O_4$), and cobalt hydroxides (e.g., cobalt hydroxide, γ-type cobalt oxyhydroxide). These conductive agents can be used singly or in a combination of two or more. For example, cobalt metal and a cobalt oxide and/or a cobalt hydroxide may be combined and used.

When the surface of the particles of the nickel oxide is coated with the conductive agent, the conductive agent is preferably a cobalt oxide and/or a cobalt hydroxide, and further preferably includes at least a cobalt hydroxide (γ-type cobalt oxyhydroxide in particular).

The amount of the conductive agent can be selected from, for example, 1 to 20 parts by mass, and is preferably 2 to 15 parts by mass, per 100 parts by mass of the nickel oxide. When the conductive agent is added to the positive electrode material mixture in the manner of being mixed together with the other components of the positive electrode material mixture, the amount of the conductive agent is preferably 3 to 20 parts by mass, or 5 to 15 parts by mass, per 100 parts by mass of the nickel oxide. Moreover, when the conductive agent is applied to the surface of the nickel oxide particles for coating, the amount of the conductive agent is preferably 2 to 10 parts by mass, or 3 to 7 parts by mass, per 100 parts by mass of the nickel oxide.

In the case of forming a conductive layer on the surface of the nickel oxide particles by applying a coating of the conductive agent to the surface, the conductive layer can be formed in a known manner in accordance with the kind of the conductive agent.

For example, a conductive layer including a metal oxide such as a cobalt oxide can be formed by (a) causing a metal hydroxide such as cobalt hydroxide to adhere to the surface of the particles including the nickel oxide, and then (b) conducting, for example, heat treatment on the resultant particles in the presence of an alkali metal hydroxide, to convert the metal hydroxide to a metal oxide such as γ-type cobalt oxyhydroxide.

In (a) above, the metal hydroxide such as cobalt hydroxide can be made to adhere to the surface of the particles including the nickel oxide, for example, by dispersing the particles in an aqueous solution including an inorganic acid salt of metal; and then adding a metal hydroxide such as cobalt hydroxide to the resultant solution. Examples of the inorganic acid salt include inorganic strong acid salts such as sulfates. To the aqueous solution including the inorganic acid salt of metal, a complexing agent as exemplified in the foregoing, such as ammomnia, may be added.

In (b) above, the particles including the nickel oxide, with the metal hydroxide such as cobalt hydroxide adhering to the particle surface, is heated in the presence of an alkali metal hydroxide such as sodium hydroxide or potassium hydroxide. Thus, the metal hydroxide such as cobalt hydroxide on the particle surface converts to an oxide such as γ-type cobalt oxyhydroxide, and a conductive layer having high conductivity is formed on the particle surface.

The positive electrode can be formed, for example, by applying a positive electrode material mixture paste to the support, the paste including the positive electrode active material, the first and second additives, and a dispersion medium; drying the resultant to remove the dispersion medium; and then pressing the resultant. In accordance with the form of the support, the positive electrode material mixture paste may be applied to the support, or filled in the pores in the support.

The positive electrode material mixture paste can be prepared by mixing the positive electrode active material, the first and second additives, and the dispersion medium. The dispersion medium can be a known medium such as water, an organic medium, or a mixed medium thereof. To the positive electrode material mixture paste, a conductive agent, a binder, a thickener, and/or other materials may be added as necessary. These (the binder and the thickener in particular) need not necessarily be added.

Examples of the binder include resin materials such as: rubbery materials such as styrene-butadiene copolymer rubber (SBR); polyolefin resins such as polyethylene and polypropylene; fluorocarbon resins such as polytetrafluoroethylene, polyvinylidene fluoride, tetrafluoroethylene-hexafluoropropylene copolymers, and tetrafluoroethylene-perfluoroalkyl vinyl ether copolymers; and acrylic resins such as ethylene-acrylic acid copolymers, ethylene-methacrylic acid copolymers, ethylene-methyl acrylate copolymers, and cross-linked products with Na ions thereof. These binders can be used singly or in a combination of two or more.

The amount of the binder is, for example, 7 parts by mass or less, and may be 0.01 to 5 parts by mass or 0.05 to 2 parts by mass, per 100 parts by mass of the active material.

Examples of the thickener include: cellulose derivatives such as carboxymethyl cellulose (CMC), modified substances thereof (including salts such as Na salts), and methyl cellulose; saponified products of polymers having vinyl acetate units, such as polyvinyl alcohol; and polyalkylene oxides such as polyethylene oxides. These thickeners may be used singly or in a combination of two or more.

The amount of the thickener is, for example, 5 parts by mass or less, and may be 0.01 to 3 parts by mass, or 0.05 to 1.5 parts by mass, per 100 parts by mass of the active material.

(Alkaline Storage Battery)

According to another aspect of the present invention, an alkaline storage battery includes: the foregoing positive electrode; a negative electrode; a separator interposed between the positive and negative electrodes; and an alkaline electrolyte.

Figure 1:
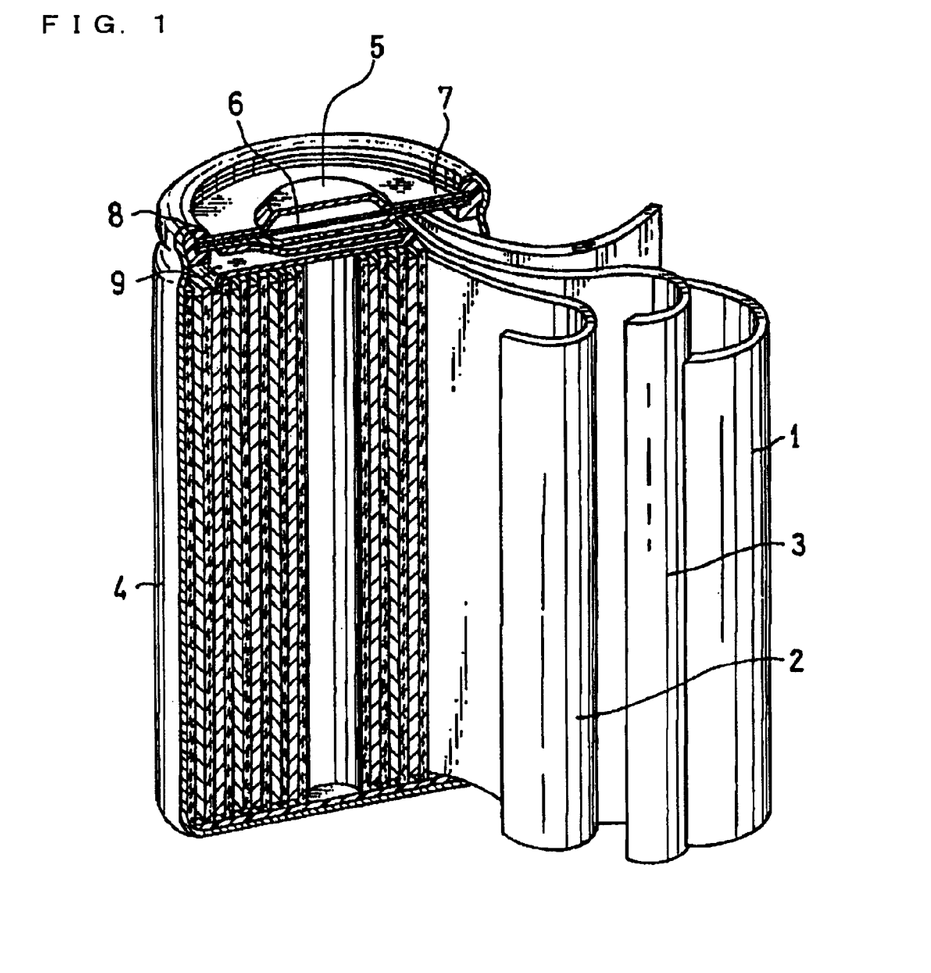
FIG. 1 is a schematic, vertical sectional view of an alkaline storage battery according to one embodiment of the present invention.

The structure of the alkaline storage battery will be described below, with reference to FIG. 1. FIG. 1 is a schematic, vertical sectional view of the structure of the alkaline storage battery according to an embodiment of the present invention.

The alkaline storage battery includes: a bottom-closed, cylindrical battery case 4 also serving as a negative terminal; an electrode assembly housed in the battery case 4; and an alkaline electrolyte (not illustrated). Regarding the electrode assembly, a negative electrode 1, a positive electrode 2, and a separator 3 interposed therebetween are spirally wound. A sealing plate 7 provided with a positive terminal 5 and a safety valve 6 is arranged on an opening portion of the battery case 4, with an insulating gasket 8 interposed therebetween. An opening end portion of the battery case 4 is crimped inwards, thereby to hermetically seal the alkaline storage battery. The sealing plate 7 is electrically connected to the positive electrode 2, via a positive electrode current collector plate 9.

The foregoing alkaline storage battery can be obtained by placing the electrode assembly in the battery case 4; injecting the alkaline electrolyte into the battery case 4; arranging the sealing plate 7 on the opening portion of the battery case 4, with the insulating gasket 8 interposed therebetween; and then sealing the opening end portion of the battery case 4, by crimping. At that time, the negative electrode 1 in the electrode assembly is electrically connected to the battery case 4, due to the outermost surface thereof coming in contact with the battery case 4. The positive electrode 2 in the electrode assembly and the sealing plate 7 are electrically connected, via the positive electrode current collector plate 9.

Examples of the alkaline storage battery include a nickel-metal hydride battery, a nickel-cadmium battery, and a nickel-zinc battery. In the present invention, since the foregoing positive electrode is used, self-discharge can be effectively suppressed even in a nickel-metal hydride battery which exhibits a high self-discharge.

In the following, the components of the alkaline storage battery, other than the positive electrode, will be described in more detail.

(Negative Electrode)

In accordance with the kind of the alkaline storage battery, a known negative electrode can be used as the negative electrode. In a nickel-metal hydride battery, for example, a negative electrode including a negative electrode active material which is a hydrogen storage alloy powder capable of electrochemically absorbing and releasing hydrogen, can be used. In a nickel-cadmium battery, for example, a negative electrode including a negative electrode active material which is a cadmium compound such as cadmium hydroxide, can be used.

The negative electrode may include: a support (or core member); and a negative electrode active material adhering to the support.

A known support can be used as the support. An example of such a known support is a porous or non-porous substrate formed of a material such as stainless steel, nickel, or an alloy thereof. When the support is a porous substrate, the active material may be filled in the pores of the support.

The negative electrode can be formed by causing a negative electrode material mixture paste including at least the negative electrode active material to adhere to the support. Specifically, the negative electrode can be formed, as in the case with the positive electrode, by applying the negative electrode material mixture paste to the support; drying the resultant to remove a dispersion medium included therein; and then pressing the resultant.

The negative electrode material mixture paste typically includes the dispersion medium, and as necessary, may additionally include components known for use in a negative electrode such as a conductive agent, a binder, and a thickener. Examples of the dispersion medium, the binder, and the thickener can include ones similar to those exemplified above for the positive electrode. The binder amount and the thickener amount can be arbitrarily selected from ranges given for the positive electrode.

The conductive agent is not particularly limited as long as it is of an electron-conductive material. Examples include: graphites such as natural graphite (e.g., graphite flakes), artificial graphite, and expanded graphite; carbon blacks such as acetylene black and Ketjen black; conductive fibers such as carbon fibers and metal fibers; metal particles such as copper powder; and conductive organic materials such as polyphenylene derivatives. These conductive agents may be used singly or in a combination of two or more. Among the above, artificial graphite, Ketjen black, and carbon fibers are preferred.

The amount of the conductive agent is, for example, 0.01 to 20 parts by mass, preferably 0.1 to 10 parts by mass, and further preferably 0.1 to 5 parts by mass, per 100 parts by mass of the active material.

The conductive agent may be added to the negative electrode material mixture paste, to be mixed together with the other components. Alternatively, a surface of particles of the negative electrode active material may be coated with the conductive agent in advance. The surface of the negative electrode active material particles can be coated with the conductive agent by a known method such as: sprinkling the conductive agent on the particle surface; causing a dispersion including the conductive agent to adhere to the particle surface, and then drying the resultant; or mechanically coating the particle surface with the conductive agent by a mechanochemical method.

(Alkaline Electrolyte)

The alkaline electrolyte is, for example, an aqueous solution including an alkaline solute. Examples of the alkaline solute include alkali metal hydroxides such as lithium hydroxide, potassium hydroxide, and sodium hydroxide. These can be used singly or in a combination of two or more.

The alkaline electrolyte preferably includes at least sodium hydroxide. Alternatively, as the alkali in the alkaline electrolyte, a combination of sodium hydroxide and at least one selected from the group consisting of potassium hydroxide and lithium hydroxide, may be used.

The concentration of the sodium hydroxide in the alkaline electrolyte is, for example, 2.5 to 11.5 mol/dm$^3$, preferably 3 to 11 mol/dm$^3$, further preferably 3.5 to 10.5 mol/dm$^3$, and particularly preferably 4 to 10 mol/dm$^3$. When the concentration of the sodium hydroxide is in the above range, charge efficiency can be increased more effectively even when charging at a high temperature, and self-discharge can be suppressed more effectively. Moreover, it is advantageous in view of suppressing reduction in the average discharge voltage while maintaining high charge efficiency, thereby enabling improvement in cycle life.

The total concentration of potassium hydroxide and lithium hydroxide in the alkaline electrolyte can be selected from, for example, 5 to 40 g/dm$^3$, and is preferably 10 to 30 g/dm$^3$ or 15 to 25 g/dm$^3$.

The specific gravity of the alkaline electrolyte is, for example, 1.1 to 1.6, and preferably 1.2 to 1.5.

(Others)

For the separator, the battery case, and other components, those known for use in an alkaline storage battery can be used. For example, a microporous membrane, a non-woven fabric, and a laminate thereof can be used as the separator. Examples of the material for a microporous film and a non-woven fabric include: polyolefin resins such as polyethylene and polypropylene; fluorocarbon resins; and polyamide resins. A separator made of polyolefin resin is preferred in view of high degradation resistance to the alkaline electrolyte.

It is preferable that a hydrophilic group is incorporated in the separator formed of a highly hydrophobic material such as polyolefin resin by hydrophilical treatment. Examples of hydrophilical treatment include corona discharge treatment, plasma treatment, and sulfonation treatment. The separator (e.g., polyolefin separator) is particularly preferably subjected to sulfonation treatment among the above treatments, that is, has a sulfonic acid group therein.

EXAMPLES

In the following, the present invention will be specifically described by way of Examples and Comparative Examples. The following Examples, however, are not to be construed as limiting in any way the scope of the present invention.

Example 1

(1) Production of Nickel Oxide

Cobalt sulfate and zinc sulfate were added to an aqueous nickel sulfate solution having a concentration of 2.5 mol/dm$^3$, such that the amount of cobalt and the amount of zinc included in the total amount of nickel, cobalt, and zinc were each 1.5 mass %. The resultant aqueous solution, an aqueous sodium hydroxide solution having a concentration of 5.5 mol/dm$^3$, and an aqueous ammonia solution having a concentration of 5.0 mol/dm$^3$ were mixed at a predetermined mass ratio; and then a nickel oxide including nickel hydroxide as a main component and Co and Zn dissolved therein, was deposited. The mixed solution at that time had a temperature of 50° C.

The deposited nickel oxide was separated by filtration. Then, the resultant was washed with an aqueous sodium hydroxide solution of 50° C. having a concentration of 2.5 mol/dm$^3$ to remove impurities such as sulfate ions in the nickel oxide; and was further washed with water, followed by drying, thereby to obtain a nickel oxide (a). The nickel oxide obtained was in the form of spherical particles with an average particle size of about 10 μm. The amount of sulfate ions $SO_4^{2-}$ remaining in the nickel oxide was 0.2 mass %.

A nickel oxide (b) with 0.4 mass % of the sulfate ions $SO_4^{2-}$ remaining therein, and a nickel oxide (c) with 0.6 mass % of the sulfate ions $SO_4^{2-}$ remaining therein, were each obtained as the foregoing except for changing, as appropriate, the concentration of each of the aqueous solutions serving as the starting materials and the mass ratio used when mixing them; the temperature of the mixed solution; and the temperature and concentration of the aqueous sodium hydroxide solution used for washing. The nickel oxides obtained were each in the form of spherical particles with an average particle size of about 10 μm.

(2) Production of Positive Electrode

The nickel oxide (a) obtained in (1) above serving as a positive electrode active material, cobalt powder serving as a conductive agent, cobalt hydroxide powder serving as a conductive agent, and first and second additives as shown in Table 1, were mixed at a mass ratio of 100:7:5:X:Y. A predetermined amount of water was added to the resultant, followed by kneading, thereby to prepare a positive electrode material mixture paste.

A porous nickel foam (porosity: 95%, surface density: 300 g/cm$^2$) serving as a support was filled with the positive electrode material mixture paste obtained. The resultant was dried, pressed, and then cut to a predetermined size (thickness: 0.5 mm, length: 110 mm, width: 35 mm), thereby to produce each of positive electrodes A1 to A33. The positive electrodes A1 to A33, which correspond to Composition Nos. 1 to 33 respectively in Table 1, each included the first and second additives as indicated therein. Regarding the positive electrode, the amount of the positive electrode material mixture to be filled and the degree of pressure for pressing, were each adjusted such that the theoretical capacity of the positive electrode became 1,000 mAh on the assumption that the nickel oxide participates in a single-electron-involving reaction during charge and discharge. A support-exposed portion was formed at one lengthwise end portion of the positive electrode.

Positive electrodes B1 to B33 and positive electrodes C1 to C33 were produced as the foregoing except for using, in place of the nickel oxide (a), the nickel oxide (b) or the nickel oxide (c).

TABLE 1

| Composition No. | First additive | | | | Second additive | | | |
|---|---|---|---|---|---|---|---|---|
| | $Yb_2O_3$ | $In_2O_3$ | $Ca(OH)_2$ X | $Ba(OH)_2$ | $TiO_2$ | $V_2O_5$ | $Sc_2O_3$ Y | $Nb_2O_5$ |
| 1 | 1 | | | | | | | |
| 2 | 2 | | | | | | | |
| 3 | 1 | | | | 1 | | | |
| 4 | 1 | | | | | 1 | | |
| 5 | 1 | | | | | | 1 | |
| 6 | 1 | | | | | | | 1 |
| 7 | | 1 | | | | | | |
| 8 | | 2 | | | | | | |
| 9 | | 1 | | | 1 | | | |
| 10 | | 1 | | | | 1 | | |
| 11 | | 1 | | | | | 1 | |
| 12 | | 1 | | | | | | 1 |
| 13 | | | 1 | | | | | |
| 14 | | | 2 | | | | | |
| 15 | | | 1 | | 1 | | | |
| 16 | | | 1 | | | 1 | | |
| 17 | | | 1 | | | | 1 | |
| 18 | | | 1 | | | | | 1 |
| 19 | | | | 1 | | | | |
| 20 | | | | 2 | | | | |
| 21 | | | | 1 | 1 | | | |
| 22 | | | | 1 | | 1 | | |
| 23 | | | | 1 | | | 1 | |
| 24 | | | | 1 | | | | 1 |
| 25 | | | | | | | | |
| 26 | | | | | 1 | | | |
| 27 | | | | | | 1 | | |

TABLE 1-continued

| Composition No. | First additive | | | | Second additive | | | |
|---|---|---|---|---|---|---|---|---|
| | Yb$_2$O$_3$ | In$_2$O$_3$ | Ca(OH)$_2$ X | Ba(OH)$_2$ | TiO$_2$ | V$_2$O$_5$ | Sc$_2$O$_3$ Y | Nb$_2$O$_5$ |
| 28 | | | | | | | 1 | |
| 29 | | | | | | | | 1 |
| 30 | | | 2 | | | | | |
| 31 | | | | | 2 | | | |
| 32 | | | | | | | 2 | |
| 33 | | | | | | | | 2 |

The positive electrode corresponding to Composition No. 25 not including the first additive and the second additive, and the positive electrodes corresponding to Composition Nos. 1, 2, 7, 8, 13, 14, 19, 20, and 26 to 33, respectively, including only one of the first additive and the second additive, are of Comparative Examples. The positive electrodes C1 to C33 each using the nickel oxide with 0.6 mass % of the sulfate ions remaining therein, are also of Comparative Examples.

(3) Production of Negative Electrode

Hundred parts by mass of MmNi$_{3.6}$Co$_{0.7}$Mn$_{0.4}$Al$_{0.3}$ serving as a hydrogen storage alloy, 0.15 part by mass of carboxymethyl cellulose serving as a thickener, 0.3 part by mass of carbon black serving as a conductive agent, and 0.7 part by mass of styrene-butadiene copolymer serving as a binder, were mixed. Water was added to the mixture obtained, followed by further mixing, thereby to prepare a negative electrode material mixture paste.

The negative electrode material mixture paste was applied to both surfaces of a punched metal of nickel-plated iron (thickness: 30 μm) serving as a support, to forma coating. The coatings obtained were dried and then pressed together with the support. Then, the resultant was cut to a predetermined size (thickness: 0.3 mm, length: 134 mm, width: 36 mm), thereby to prepare a negative electrode of a hydrogen storage alloy. The capacity of the negative electrode was adjusted to 1600 mAh. A support-exposed portion was formed at one lengthwise end portion of the negative electrode (winding finish end portion of electrode assembly).

(4) Production of Alkaline Storage Battery

Using the positive electrode A1 obtained in (2) above and the negative electrode obtained in (3) above, an alkaline storage battery (nickel-metal hydride battery) having a structure as illustrated in FIG. 1 was produced.

Specifically, first, a positive electrode 2 and a negative electrode 1 were stacked and spirally wound, with a separator 3 interposed therebetween, thereby to form an electrode assembly. The separator 3 was a separator made of sulfonated polypropylene.

A positive electrode current collector plate 9 was welded to the support-exposed portion of the positive electrode 2; and a sealing plate 7 and the positive electrode current collector plate 9 were electrically connected via a positive lead. The electrode assembly was placed in a bottom-closed, cylindrical battery case 4 also serving as a negative terminal; and the outermost surface of the negative electrode 1 and the inner wall of the battery case 4 were brought into contact to establish an electrical connection therebetween.

An outer peripheral portion of the battery case 4, being in the vicinity of the opening of the case, was dented inwards to provide a groove portion; and 2.0 cm$^3$ of an alkaline electrolyte was injected into the battery case 4. The alkaline electrolyte included: an aqueous sodium hydroxide solution with a specific gravity of 1.3; and lithium hydroxide dissolved therein to have a concentration of 20 g/dm$^3$.

Next, the sealing plate 7 provided with a positive terminal 5 and a safety valve 6 was attached to an opening portion of the battery case 4, with an insulating gasket 8 interposed therebetween. An opening end portion of the battery case 4 was crimped towards the insulating gasket 8 to seal the battery case 4, thereby to produce a hermetically-sealed, size AA nickel-metal hydride battery A1 with its battery capacity regulated by the positive electrode and with a theoretical capacity of 1000 mAh.

Nickel-metal hydride batteries A2 to A33, B1 to B33, and C1 to C33 were produced as the foregoing except for using, in place of the positive electrode A1, the positive electrodes A2 to A33, B1 to B33, and C1 to C33 for the batteries A2 to A33, B1 to B33, and C1 to C33, respectively.

Each of the nickel-metal hydride batteries was charged and discharged (temperature: 20° C., charge conditions: 16 hours at 100 mA, discharge conditions: 5 hours at 200 mA) for activation; and then evaluated in the following manner.

(5) Evaluation of Positive Electrode Utilization Rate

A charge-discharge test was conducted on each of the nickel-metal hydride batteries obtained in (4) above in a manner described below, and the utilization rate of the nickel oxide serving as the positive electrode active material (positive electrode utilization rate) was obtained. The positive electrode utilization rate served as an index for charge characteristics.

Specifically, each of the nickel-metal hydride batteries was charged at an ambient temperature of 20° C. and a charge rate of 0.1 It for 16 hours; left at an ambient temperature of 25° C. for 3 hours; and then, discharged at an ambient temperature of 20° C. and a discharge rate of 0.2 It, until 1.0 V. This charge-discharge cycle was repeated 2 times, and the discharge capacity at the 2$^{nd}$ cycle was obtained. Based on the discharge capacity obtained, the positive electrode utilization rate was obtained by the equation below.

Positive electrode utilization rate (%)=discharge capacity(mAh)/1000 (mAh)×100

Moreover, the positive electrode utilization rate for 45° C. and 60° C., respectively, were obtained as the foregoing with the ambient temperature during charge changed to 45° C. or 60° C.

Figure 2:
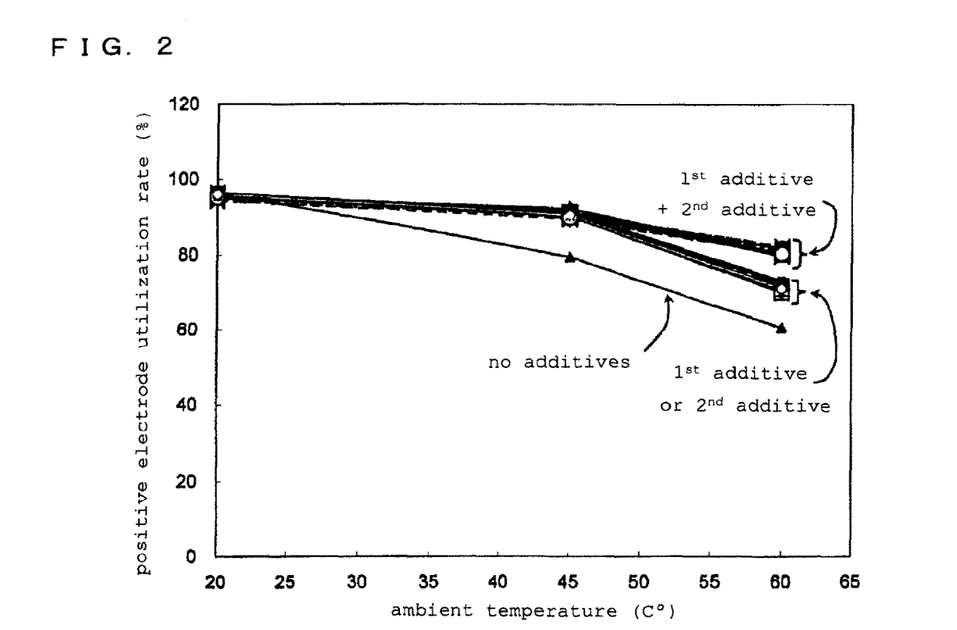
FIG. 2 is a graph showing a relation between the utilization rate of the positive electrode active material and the ambient temperature during charge, for the nickel-metal hydride batteries A1 to A33 in the Examples and Comparative Examples.
Figure 3:
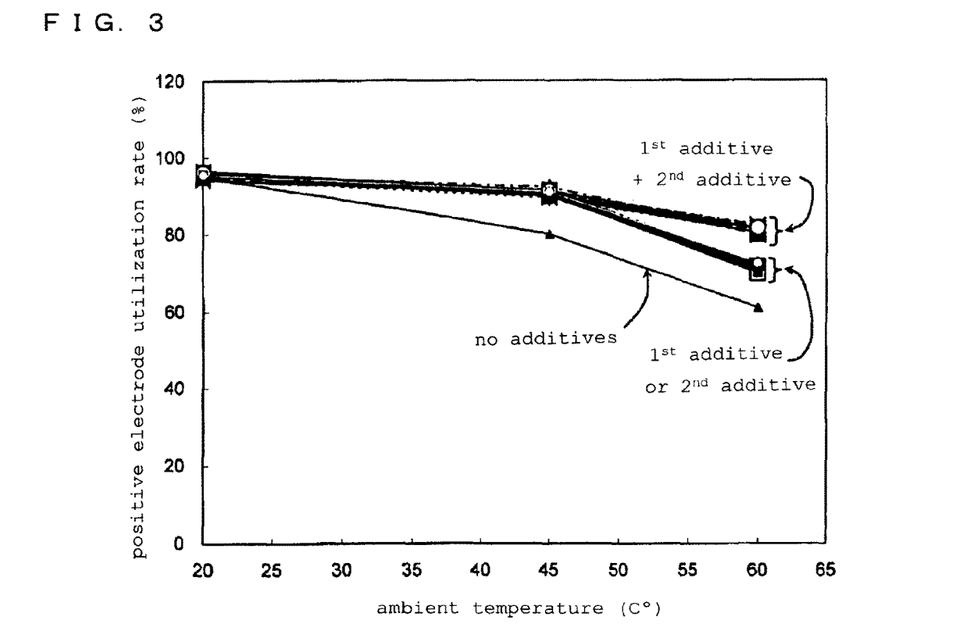
FIG. 3 is a graph showing a relation between the utilization rate of the positive electrode active material and the ambient temperature during charge, for the nickel-metal hydride batteries B1 to B33 in the Examples and Comparative Examples.
Figure 4:
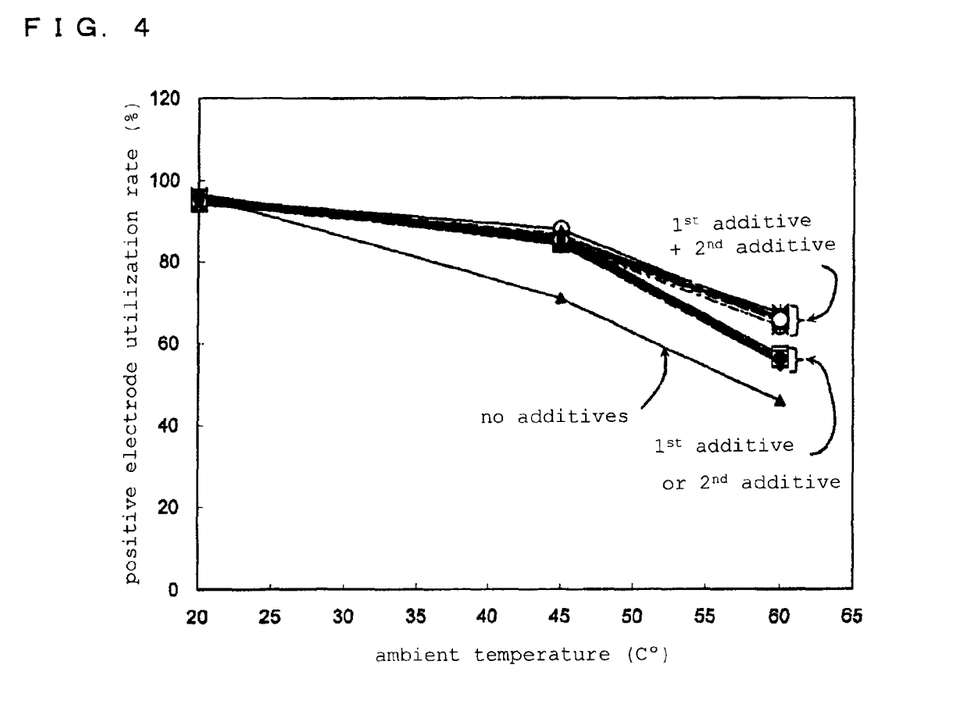
FIG. 4 is a graph showing a relation between the utilization rate of the positive electrode active material and the ambient temperature during charge, for the nickel-metal hydride batteries C1 to C33 in the Comparative Examples.

FIG. 2 shows a relation between the positive electrode utilization rate and the ambient temperature during charge for the batteries A1 to A33. FIG. 3 shows a relation between the positive electrode utilization rate and the ambient temperature during charge for the batteries B1 to B33. FIG. 4 shows a relation between the positive electrode utilization rate and the ambient temperature for the batteries C1 to C33.

(6) Evaluation of Self-Discharge

Each of the nickel-metal hydride batteries obtained in (4) above was charged at 20° C. and a charge rate of 0.1 It for 16 hours. Then, each of the charged batteries was stored at an ambient temperature of 45° C. for 2 weeks. Then, each of the batteries after storage was discharged at 20° C. and a discharge rate of 0.2 It, until 1.0 V; and the discharge capacity (mAh) at that time was obtained.

Based on the discharge capacity obtained, percentage of the capacity remaining in each of the nickel-metal hydride batteries after storage was obtained by the following equation, and the percentage obtained served as an index for self-discharge.

Percentage of remaining capacity (%)=(discharge capacity after storage)(mAh)/(discharge capacity before storage)(mAh)×100

(7) Results and Observations

As shown in FIGS. 2 and 3, regarding the batteries of group A with 0.2 mass % as the remaining sulfate ion amount, and the batteries of group B with 0.4 mass % as the remaining sulfate ion amount, the batteries of the Examples to which both of the first and second additives were added, exhibited high positive electrode utilization rates of 90% or more at 20° C. and 45° C. Moreover, the batteries of the Examples were able to maintain high positive electrode utilization rates of 80% or more, even at a temperature of 60° C. As the above, improvement in charge efficiency was evident in the Examples.

In contrast, regarding the batteries of the Comparative Examples including only one of the first additive and the second additive (batteries A and B of Composition Nos. 1, 2, 7, 8, 13, 14, 19, 20, and 26 to 33), high positive electrode utilization rates were able to be maintained at 20° C. and 45° C. However, at a temperature of 60° C., the positive electrode utilization rates dropped drastically, and resulted in only about 70%. Moreover, regarding the batteries of the Comparative Examples not including any of the first additive and the second additive (battery A25 and battery B25), although high positive electrode utilization rates of over 90% were obtained at 20° C., the rates gradually lowered as the temperature increased, and resulted in only 60% at 60° C.

As shown in FIG. 4, regarding the batteries of group C with 0.6 mass % as the remaining sulfate ion amount, the battery C25 to which the first and second additives were not added, exhibited a positive electrode utilization rate of only about 70% at 40° C., and of less than 50% at 60° C. Moreover, when one of the first additive and the second additive was added, positive electrode utilization rates of over 80% were obtained at 45° C., but the rates dropped to near 50% at 60° C. (batteries C1, C2, C7, C8, C13, C14, C19, C20, and C26 to C33). Still moreover, even when both of the first and second additives were added, the positive electrode utilization rates at 60° C. dropped to near 60% (batteries C3 to C6, C9 to C12, C15 to C18, and C21 to C24).

That is, when the remaining sulfate ion amount was large, reduction in the positive electrode utilization rate at a high temperature could not be suppressed, even with use of the first and second additives. When the remaining sulfate ion amount was small, the effect due to combining the first and second additives was obtained quite remarkably, and a high positive electrode utilization rate was able to be achieved even at a high temperature. Thus, a high charge efficiency was able to be maintained.

The percentage of remaining capacity in each of the nickel-metal hydride batteries is shown in Table 2 below.

TABLE 2

| Battery No. | Percentage of remaining capacity (%) | | |
|---|---|---|---|
| | A | B | C |
| 1 | 80.8 | 80.3 | 78.2 |
| 2 | 81.0 | 81.5 | 79.0 |
| 3 | 85.5 | 85.4 | 80.0 |
| 4 | 85.3 | 85.1 | 79.8 |
| 5 | 85.1 | 85.8 | 79.0 |
| 6 | 86.0 | 85.7 | 79.5 |
| 7 | 80.7 | 80.4 | 77.5 |
| 8 | 80.5 | 81.0 | 78.0 |
| 9 | 86.0 | 85.6 | 79.5 |
| 10 | 85.5 | 85.4 | 79.9 |
| 11 | 85.1 | 85.9 | 79.0 |
| 12 | 85.4 | 85.1 | 79.8 |
| 13 | 80.5 | 80.6 | 78.6 |
| 14 | 80.0 | 80.5 | 80.0 |
| 15 | 85.4 | 85.0 | 79.8 |
| 16 | 85.9 | 85.6 | 79.5 |
| 17 | 85.1 | 85.8 | 79.0 |
| 18 | 85.5 | 85.4 | 79.8 |
| 19 | 80.5 | 80.3 | 79.6 |
| 20 | 80.2 | 80.6 | 80.1 |
| 21 | 85.1 | 85.9 | 79.0 |
| 22 | 85.4 | 85.0 | 79.9 |
| 23 | 85.5 | 85.5 | 79.8 |
| 24 | 85.8 | 85.6 | 79.5 |
| 25 | 80.5 | 80.6 | 78.5 |
| 26 | 80.8 | 80.2 | 78.2 |
| 27 | 80.7 | 80.3 | 78.2 |
| 28 | 80.7 | 80.3 | 77.5 |
| 29 | 80.5 | 80.3 | 79.5 |
| 30 | 81.0 | 81.0 | 79.0 |
| 31 | 80.5 | 80.0 | 79.5 |
| 32 | 80.4 | 80.3 | 78.5 |
| 33 | 80.3 | 80.7 | 79.0 |

As evident from Table 2, regarding the batteries of group A with 0.2 mass % as the remaining sulfate ion amount, and the batteries of group B with 0.4 mass % as the remaining sulfate ion amount, the batteries of the Examples to which both of the first and second additives were added, exhibited high percentages of remaining capacity of 85% or more, even after the 2 week-storage at 45° C. That is, regarding the batteries of the Examples, it was evident that self-discharge during storage was suppressed and high storage characteristics were achieved.

In contrast, regarding the batteries of the Comparative Examples (batteries A and B of Composition Nos. 1, 2, 7, 8, 13, 14, 19, 20, and 26 to 33) including only one of the first additive and the second additive, the percentages of remaining capacity were low, being merely about 80%. The battery A25 and the battery B25 of the Comparative Examples including none of the first additive or the second additive, also exhibited percentages of remaining capacity of about 80%.

The batteries of group C with 0.6 mass % as the remaining sulfate ion amount, exhibited low percentages of remaining capacity after storage, being about 80% or less. Regarding the batteries of group C, the percentages of remaining capacity did not differ much from one another, whether the first and second additives were not added, either one of the additives were added, or both of the additives were added. That is, when the remaining sulfate ion amount was large, an effect due to adding the additives was hardly obtained.

However, when the remaining sulfate ion amount was small, the effect due to using both of the first and second additives was obtained quite remarkably, and a high percentage of remaining capacity was able to be maintained even after storage at a high temperature.

In the Examples, a compound including Ca, Ba, In, or Yb as the first additive, and a compound including Sc, Ti, V, or Nb, were used illustratively. However, an effect similar to the foregoing has also been observed with use of a compound including Be, Sb, Er, Tm, and/or Lu (e.g., BeO, $Sb_2O_2$, $Er_2O_2$, $Tm_2O_3$, $Lu_2O_3$) as the first additive. Moreover, an effect similar to the foregoing has also been observed with use of a compound including Zn and/or Zr (e.g., ZnO, $ZrO_2$) as the second additive.

In the Examples, the conductive agent was added to the positive electrode material mixture, illustratively. However, it has been observed that an effect similar to the foregoing is also obtained when the conductive agent is coated on a surface of the nickel oxide particles serving as the positive electrode active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

When the positive electrode of the present invention is used in an alkaline storage battery, a high charge efficiency is achieved even when the battery is charged over a wide range of temperatures including high temperatures. Moreover, self-discharge of the battery can be effectively suppressed. Therefore, an alkaline storage battery using the above positive electrode is useful as a power source for, for example, various kinds of electronic devices, transport devices, and electricity storage devices, and is also suited for use as a power source for, for example, electric vehicles and hybrid vehicles.

REFERENCE SIGNS LIST 1 negative electrode
2 positive electrode
3 separator
4 battery case
5 positive terminal
6 safety valve
7 sealing plate
8 insulating gasket
9 positive electrode current collector plate

The invention claimed is:

1. A positive electrode for an alkaline storage battery including at least one of a nickel oxyhydroxide and a nickel hydroxide as a positive electrode active material, a first additive, and a second additive differing from the first additive,
an amount of sulfate ions $SO_4^{2-}$ remaining in the at least one nickel oxyhydroxide and nickel hydroxide being 0.45 mass % or less,
the first additive being a compound including at least one selected from the group consisting of ytterbium, indium, calcium, barium, beryllium, antimony, erbium, thulium, and lutetium,
the second additive being at least one selected from the group consisting of $TiO_2$, $V_2O_5$, $Sc_2O_3$, $Nb_2O_5$, and $ZrO_2$ wherein an amount of the first and second additives per 100 parts by mass of the at least one nickel oxyhydroxide and nickel hydroxide is 0.1 to 5 parts by mass in total, and a mass ratio of the first additive to the second additive is 1:0.2-5.

2. The positive electrode for an alkaline storage battery in accordance with claim 1, wherein an amount of the at least one nickel oxyhydroxide and nickel hydroxide in the positive electrode material mixture is 70 mass % or more.

3. The positive electrode for an alkaline storage battery in accordance with claim 1, wherein the amount of the sulfate ions $SO_4^{2-}$ remaining in the at least one nickel oxyhydroxide and nickel hydroxide is 0.4 mass % or less.

4. The positive electrode for an alkaline storage battery in accordance with claim 1,
wherein the first additive is a hydroxide or an oxide.

5. The positive electrode for an alkaline storage battery in accordance with claim 1, wherein the first additive is at least one selected from the group consisting of $Yb_2O_3$, $In_2O_3$, $Ca(OH)_2$, $Ba(OH)_2$, BeO, $Sb_2O_3$, $Er_2O_3$, $Tm_2O_3$, and $Lu_2O_3$.

6. The positive electrode for an alkaline storage battery in accordance with claim 1, wherein the positive electrode material mixture further includes a conductive agent.

7. The positive electrode for an alkaline storage battery in accordance with claim 6, wherein the conductive agent is at least one selected from the group consisting of cobalt metal, a cobalt oxide, and a cobalt hydroxide.

8. The positive electrode for an alkaline storage battery in accordance with claim 1,
wherein the at least one nickel oxyhydroxide and nickel hydroxide includes a third metal element incorporated in a crystal structure of the at least one nickel oxyhydroxide and nickel hydroxide,
the third metal element is at least one selected from the group consisting of magnesium, cobalt, cadmium, and zinc, and
an amount of the third metal element in a total amount of nickel and the third metal element included in the at least one nickel oxyhydroxide and nickel hydroxide, is 0.1 to 10 mass %.

9. The positive electrode for an alkaline storage battery in accordance with claim 1, wherein the second additive is at least one selected from the group consisting of $TiO_2$, $V_2O_5$, $Sc_2O_3$, and $Nb_2O_5$.

10. The positive electrode for an alkaline storage battery in accordance with claim 9, wherein the first additive is at least one selected from the group consisting of $Yb_2O_3$, $In_2O_3$, $Ca(OH)_2$, and $Ba(OH)_2$.

11. An alkaline storage battery including:
a positive electrode in accordance with claim 1,
a negative electrode including a hydrogen storage alloy capable of electrochemically absorbing and releasing hydrogen,
a separator interposed between the positive and negative electrodes, and
an alkaline electrolyte.

12. A positive electrode for an alkaline storage battery including at least one of a nickel oxyhydroxide and a nickel hydroxide as a positive electrode active material, a first additive, and a second additive differing from the first additive,
an amount of sulfate ions $SO_4^{2-}$ remaining in the at least one nickel oxyhydroxide and nickel hydroxide being 0.45 mass % or less, the first additive being a compound including at least one selected from the group consisting of ytterbium, indium, calcium, barium, beryllium, antimony, erbium, thulium, and lutetium, the second additive being at least one selected from the group consisting of $V_2O_5$, $Sc_2O_3$, $Nb_2O_5$, and $ZrO_2$ wherein an amount of the first and second additives per 100 parts by mass of the at least one nickel oxyhydroxide and nickel hydroxide is 0.1 to 5 parts by mass in total, and a mass ratio of the first additive to the second additive is 1:0.2-5.

13. The positive electrode for an alkaline storage battery in accordance with claim 12, wherein the second additive is at least one selected from the group consisting of $V_2O_5$, $Sc_2O_3$, and $Nb_2O_5$.

14. The positive electrode for an alkaline storage battery in accordance with claim 13, wherein the first additive is at least one selected from the group consisting of $Yb_2O_3$, $In_2O_3$, $Ca(OH)_2$, and $Ba(OH)_2$.

15. An alkaline storage battery including:
a positive electrode in accordance with claim 12,
a negative electrode including a hydrogen storage alloy capable of electrochemically absorbing and releasing hydrogen,
a separator interposed between the positive and negative electrodes, and
an alkaline electrolyte.

* * * * *